United States Patent
Wildhaber

[15] 3,689,966
[45] Sept. 12, 1972

[54] ROTARY CUTTER WITH HELICALLY DIRECTED CUTTING TEETH ARRANGED IN A CIRCLE

[72] Inventor: Ernest Wildhaber, 124 Summit Dr., Brighton, N.Y. 14620

[22] Filed: June 8, 1970

[21] Appl. No.: 44,089

[52] U.S. Cl. ................................29/103 C, 90/1.65
[51] Int. Cl. ...............................................B26d 1/12
[58] Field of Search........29/95, 103, 103 A, 103 B, 103 C, 29/105, 105.1; 90/1.65

[56] References Cited

UNITED STATES PATENTS

| | | | |
|---|---|---|---|
| 1,681,994 | 8/1928 | Miller | 29/103.3 X |
| 1,913,865 | 6/1933 | Wildhaber | 29/103.3 |
| 2,304,586 | 12/1942 | Miller | 29/103.2 |
| 2,324,003 | 7/1943 | Kitchen et al. | 29/103.3 |
| 2,410,544 | 11/1946 | Mackmann | 29/103.2 |

FOREIGN PATENTS OR APPLICATIONS

| | | | |
|---|---|---|---|
| 396,339 | 8/1933 | Great Britain | 29/105 |
| 371,326 | 9/1963 | Switzerland | 29/103.2 |

*Primary Examiner*—Harrison L. Hinson
*Attorney*—Shlesinger, Fitzsimmons & Shlesinger

[57] ABSTRACT

Cutters of the type referred to have cutting teeth inclined to the peripheral direction and arranged in a circle about the cutter axis. They require large amounts of relief for cutting clearance and produce a tooth shape depending also on the cutter diameter. The invention provides pairs of cutters, each cutter of the pair finish-cutting one side only of the teeth produced. Relief variation over the cutting profile is reduced and maximum relief angles are diminished with side surfaces of the cutting teeth that converge from front to rear. The tooth shape produced is maintained constant after sharpening, with cutting teeth that have a constant distance from the cutter axis from front to rear. The side surfaces of the cutting teeth are helical surface coaxial with the cutter.

6 Claims, 9 Drawing Figures

PATENTED SEP 12 1972 3,689,966

INVENTOR:
Ernest Wildhaber

ROTARY CUTTER WITH HELICALLY DIRECTED CUTTING TEETH ARRANGED IN A CIRCLE

The present invention relates to rotary cutters for cutting teeth on cylindrical or approximately cylindrical blanks. The cutters have cutting teeth arranged in a circle about the cutter axis. They are inclined to the peripheral direction of the cutter. That is, they are helically directed.

In operation the cutter axes are inclined to the direction of the axis of the workpiece, generally at an angle larger than thirty degrees and often at a right angle. The cutters are rotated in time with the workpiece while feed motion is provided between the cutters and the workpiece in the direction of the axis of the workpiece. Helical teeth or straight teeth may be produced. The cutters may be sharpened by regrinding their cutting faces.

Cutters of this type require much relief to assure clean cutting and to avoid rubbing. Cutters that finish-cut with both sides of their cutting teeth have their cutting edges relieved with the restriction to preserve the tooth thickness after sharpening. This requirement calls for far more relief at the end-cutting edges than necessary for cutting. Excess relief shortens cutter life.

One object of the invention is to extend cutter life and at the same time increase productivity by using a pair of cutters of this type for finishing opposite sides respectively of the teeth, and providing the cutting teeth with a shape that gives more nearly uniform relief all around the cutting profile than hitherto attained.

A further object is to provide cutters of this character that preserve the exact shape produced on the workpieces also after sharpening, and to provide relatively simple relief surfaces that are helical surfaces of constant lead.

Other aims will appear in the course of the specification and in the recital of the appended claims.

Examples are shown in the drawing, in which

FIG. 1 is a fragmentary sectional view showing a pair of cutters constructed according to the invention in engagement with a workpiece containing helical teeth. The sectional plane is perpendicular to the axis of the workpiece and contains the axes of the cutter pair. For convenience of illustration the cutter radii are shown out of proportion, being actually much larger than shown.

Figure 1:
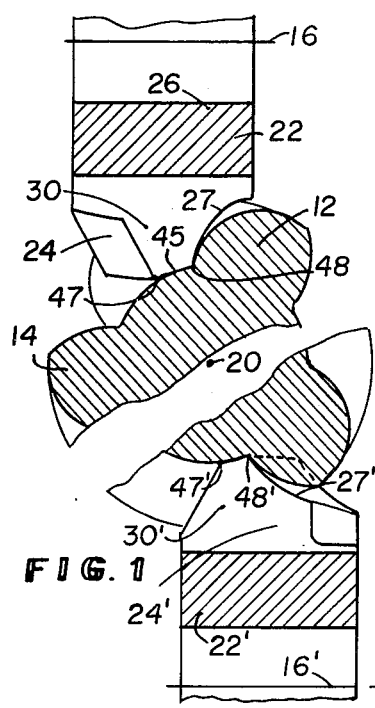
Figure 4:
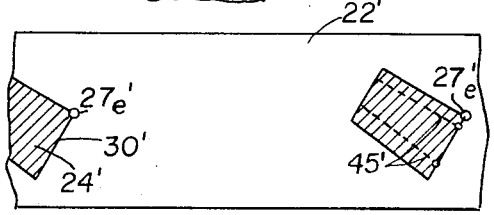
Figure 5:
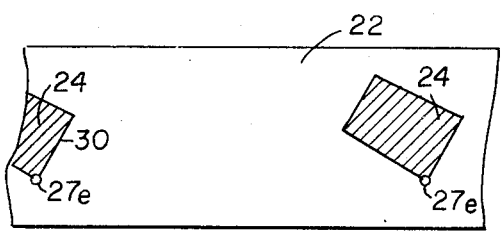

FIGS. 4 and 5 are developments to a plane of a cylindrical mid-section coaxial with the cutters 22' and 22 of Fig. 1 respectively.

Figure 6:
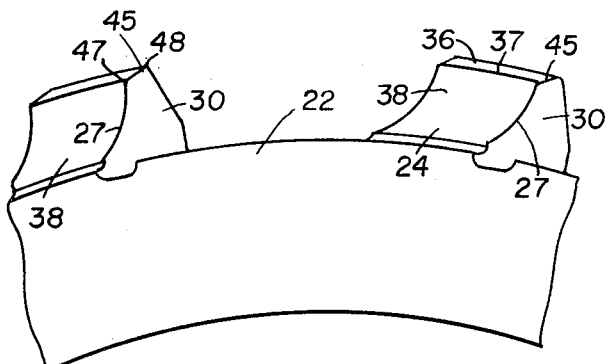

FIG. 6 is a fragmentary axial view of a cutter with concave cutting edges, embodying the invention.

Figure 7:
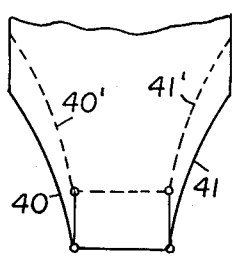

FIG. 7 is a diagram explanatory of conventional radial relief on a cutter having finish-cutting edges on both sides, looking in the cutting direction.

Figure 8:
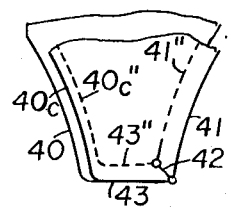

FIG. 8 is a diagram explanatory of the relief provided on cutters made according to the invention, looking in the cutting direction.

Figure 9:
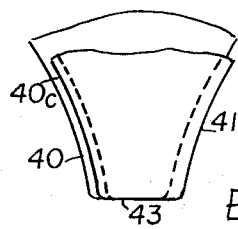

FIG. 9 is a diagram similar to FIGS. 8, but taken looking in the direction of the cutter axis.

Figure 2:
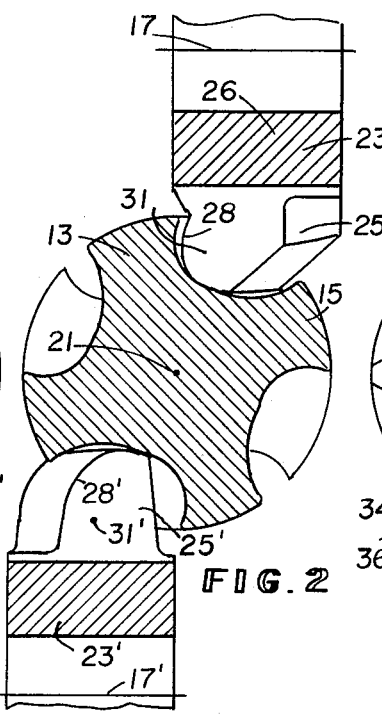
FIG. 2 is a similar view showing a workpiece with concave tooth profiles. The workpieces shown in FIGS. 1 and 2 are rotors of a compressor.

The workpieces 12 and 13 shown in FIGS. 1 and 2 are mating compressor rotors that have helical teeth 14, 15. The cutter axes 16, 16'; 17, 17' are here shown at right angles to the direction of the axis 20, 21 respectively of the workpiece. They could however also be arranged at other angles, but preferably at angles larger than thirty degrees.

Each of the cutters 22, 22' and 23, 23' has cutting teeth 24, 24' and 25, 25' respectively that project outwardly from a body part 26. They are inclined to the peripheral direction of the cutter to match the direction of the tooth spaces of the workpiece. The cutting teeth 24 are arranged in a circle about the cutter axis, as are the cutting teeth of the cutters 22', 23, 23'. This means that these cutting teeth have equal positions lengthwise of the respective cutter axis.

The cutting edges 27, 27' for applying the finishing cut are concavely curved. The finish-cutting edges 28, 28' are convex. The cutting edges are formed on the cutting teeth by cutting faces 30, 30' and 31, 31' respectively. Plane or helical cutting faces are preferably used.

Figure 3:
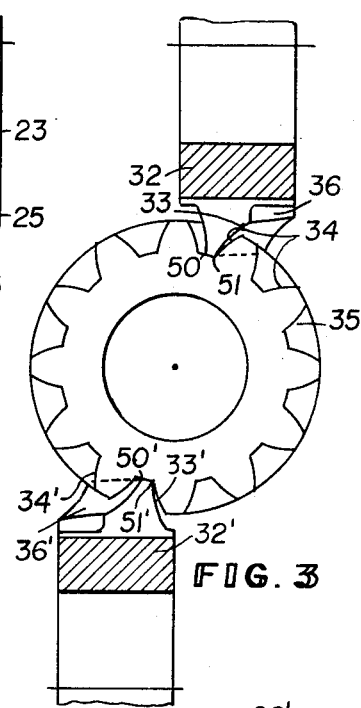
FIG. 3 is a similar view showing a pair of cutters in engagement with a gear having helical teeth.

FIG. 3 shows a pair of cutters 32, 32' having finish-cutting edges 33, 33' for cutting opposite sides 34, 34' respectively of a gear 35. Here also the cutting teeth 36, 36' are inclined to the peripheral direction of the cutter.

FIG. 4 represents a development to a plane of the cutter 22' of FIG. 1, while FIG. 5 is a development of cutter 22 of the cutter pair 22, 22'. The developed surface is a cylindrical surface coaxial with the cutter and laid through the cutting teeth intermediate their outside and bottom circles. The intersection with the finish-cutting edges are marked with circular points $27_e, 27_e'$.

The axial view (FIG. 6) of cutter 22 shows the nature of the cutting teeth and of their side and end surfaces most clearly. This cutter is typical of the cutters constructed according to the invention. The outside end 36 of each cutting tooth extends along a helix 37 from front to rear, at a constant distance from the cutter axis. The helix appears as a circle in the axial view. The side surface 38 that contains the finish-cutting edge 27 is a helical surface coaxial with the cutter and of constant lead. It has a concave profile.

FIG. 7 shows the relief problem for cutters that have finish-cutting edges 40, 41 on opposite sides. The dotted lines 40', 41' show the cutting edges as they appear after repeated sharpening, viewed at the same cutter position. The distance between the dotted lines and the full lines is a measure of the relief angle at the various points of the cutting profile. The relief angles vary considerably even on the sides and are largest at the outer profile ends.

FIG. 8 describes the relief provided on a cutter of a pair constructed according to the invention. In this view taken in the cutting direction the relief is both sidewise and inwardly, in direction 42. The distance between the full lines and the dotted lines, 41–41'', 43–43'' and $40_c$–$40_c''$ respectively, is a measure of the relief angle at the considered region. The relief desired at the clearance side $40_c$ depends on what this side has to do. No relief is needed when it does not cut.

The other cutter of the pair is also relieved sidewise and inwardly, a direction inclined equally and oppositely to direction 42, as shown in FIGS. 4 and 5. The view is here in the cutting direction.

It is readily seen that the relief is much more evenly spread over the profile than in FIG. 7, and that the maximum relief angle is much smaller.

It should be noted that the cutting tooth is thinned down from front to rear. Likewise the outside ends thereof decrease in width from front to rear, as shown in dotted lines for end surface 45' in FIG. 4. After resharpening the two cutters of the pair are adjusted axially or angularly to cut the required constant tooth thickness.

Opposite side surfaces of each cutting tooth 24, 24'; 25, 25'; 36, 36' are helical surfaces coaxial with the cutter. They have different constant leads, so that they converge from front to rear.

The use of a pair of cutters has the further advantage that the finish-cutting edges can be provided with the best possible cutting angle, that is inclination of the cutting face. Here it does not have to be a compromise between opposite sides.

It should also be noted that the cutting edges 45 (FIG. 6) at the outside ends of the cutting teeth, that cut the tooth bottom, are inclined, so that opposite ends thereof have different distances from the cutter axis. Thus opposite end points 47, 48 on cutter 22 and end points 50, 51 on cutter 32 have different radial distances from the cutter axis. Points 47 and 51 have the larger distance. On cutter 22' end point 48' has a larger radial distance than end point 47'. On cutter 32' end point 50' has a larger radial distance than end point 51'. It is seen that the end points 48', 51 at the finishing edge have the larger radial distance only on one cutter of the pair. On the other cutter the opposite end point of the outside cutting edge has the larger radial distance.

When the tooth number of the workpiece exceeds about fifteen I may provide a further cutting tooth ahead of each described cutting tooth, if desired. This further cutting tooth is shaped to cut with the outside end only. It cuts the tooth bottom, thereby relieving said described cutting tooth of part of the load.

One way of determining the shape of the cutting edges will now be described. A wormgear may be made that is fully conjugate to the given tooth shape of the workpiece. Gashes or future cutting faces are applied to this wormgear at a suitable distance back of its throat. Then helical surfaces are formed about the axis of the wormgear with these cutting edges, so that these helical surfaces recede from the tooth surfaces of the wormgear, to provide relief or cutting clearance. The shape is then duplicated on a cutter.

The wormgear could be formed by hobbing with a hob that represents the finished workpiece. It could also be generated with a reciprocatory tool that by its helical (or straight) reciprocation describes the shape of the finished workpiece, while turning motion is provided about the axes of the wormgear and tool as if the wormgear and said workpiece were running and meshing.

It is also possible to compute the shape of the cutting edges directly.

While I prefer cutting teeth that extend at a constant distance from the cutter axis, some of the advantages of the invention can be secured by merely approximating this solution. When the outside ends of the cutting teeth are inscribed into a surface of revolution departing only a little from a cylindrical surface coaxial with the cutter, partial benefits are reaped. The term inscribed implies at least line contact. When they are inscribed into a surface of revolution coaxial with the cutter, having a profile in an axial plane inclined less than two degrees to the direction of the cutter axis within the working range of the cutting teeth, then they may be considered approximating inscription within a cylindrical surface whose elements are parallel to the cutter axis. They approximate the characteristic of the present invention. This means using a top relief angle of less than one degree in the illustrated examples, where the inclination of the cutting teeth to the periphery amounts to thirty degrees.

Further modifications may be made in my invention without departing from its spirit. For definition of its scope it is relied on the appended claims.

I claim:

1. A rotary cutter for cutting tooth sides in a relative feed motion axially of a workpiece, comprising
   a generally cylindrical body part,
   cutting teeth projecting outwardly from said body part,
   said cutting teeth being arranged in a circle about the axis of said cutter and being inclined to the peripheral direction thereof,
   cutting edges being formed on said cutting teeth by cutting faces inclined to said peripheral direction,
   the outside ends of said cutting teeth extending along helices from front to rear at a constant distance from the cutter axis,
   at least one side surface of each cutting tooth being a helical surface coaxial with the cutter and of constant lead,
   the opposite side surface thereof converging towards said one side surface from front to rear.

2. A cutter according to claim 1, whereon
   opposite side surfaces of each cutting tooth are helical surfaces coaxial with the cutter,
   said surfaces have different constant leads so that they converge from front to rear.

3. A cutter according to claim 1, having curved cutting edges at least on one side of is cutting teeth.

4. A cutter for finish-cutting one side of the teeth of a workpiece in a relative feed motion axially of said workpiece, comprising
   a generally cylindrical body part,
   cutting teeth projecting outwardly from said body part,
   said cutting teeth being arranged in a circle about the axis of said cutter and being inclined to the peripheral direction thereof,
   cutting edges being formed on said cutting teeth by cutting faces inclined to said peripheral direction,
   the outside ends of said cutting teeth being inscribed from front to rear into a surface of revolution coaxial with the cutter,
   the profile of an axial section of said surface being inclined less than two degrees to the direction of the cutter axis within the working range of said cutting teeth,
   said outside ends being bounded by lines converging towards one another from front to rear.

5. A cutter according to claim 4, whereon
   the finish-cutting edges are concavely curved.

6. A rotary cutter for cutting tooth sides in a relative feed motion axially of a workpiece, comprising
a circular disk-like body part,
cutting teeth rigid with said body part projecting outwardly therefrom,
said cutting teeth being arranged in a circle about the axis of said cutter and being inclined to the peripheral direction thereof,
cutting edges being produced on said cutting teeth by cutting faces inclined to said peripheral direction,
said cutting teeth being shaped for sharpening by regrinding the cutting faces and containing sidecutting edges profiled to produce the entire profiles of said tooth sides,
at least one side surface of each of said cutting teeth being a helical surface coaxial with the cutter and of constant lead,
and the cutting edges, that are at the tips of the cutting teeth and that cut the bottoms of spaces between teeth of the article to be cut, having their opposite ends at different distances from the cutter axis.

* * * * *